: 3,790,454
Patented Feb. 5, 1974

3,790,454
ELECTRODEPOSITION OF SPONGE NICKEL
Ian H. S. Henderson, Ottawa, Ontario, and Stephan George Ladan, Edmonton, Alberta, Canada, assignors to Her Majesty the Queen in Right of Canada as represented by the Minister of National Defence
No Drawing. Continuation of abandoned application Ser. No. 625,945, Mar. 27, 1967. This application Jan. 22, 1971, Ser. No. 109,022
Int. Cl. C23b 5/08
U.S. Cl. 204—49     8 Claims

ABSTRACT OF THE DISCLOSURE

Sponge nickel is electrolytically deposited from a conventional nickel plating bath to which finely divided low density nickel powder has been added.

---

This application is a continuation of application Ser. No. 625,945, filed Mar. 27, 1967, now abandoned.

BACKGROUND OF THE INVENTION

This invention relates to electrodes for electrolytic cells and substrates for such electrodes having a high surface area. More particularly, this invention relates to electrodes and substrates bearing sponge nickel, and methods of producing the same.

Conventional high-rate nickel cadmium batteries employ sintered nickel as the support for the active materials of the electrodes. However, the cost of sintering nickel is roughly dependent only on the projected surface area, and not on the thickness, so that the cost per unit weight of very thin layers of sintered nickel is relatively high. Electrodeposition of nickel sponge could be expected to be competitive with sintering, especially in thinner deposits, the cost of electrolytic deposition on a cathode being proportional to the thickness of the deposit. The preparation of porous metals by electrolytic reduction of compressed metal oxides has been stated to be very difficult to perform with the "transition" metals, of which nickel is a typical example. Attempts to make nickel sponge electrolytically by operating conventional plating baths at very high current densities led to the deposition of non-adherent or easily friable, loosely adherent spherical nickel particles. Surfaces prepared in this manner, although roughened, did not have a very high surface area.

Sponge nickel deposits have been obtained electrolytically by employing conventional nickel plating baths with graphite or lamp-black additions. However, it was found that the carbon-contaminated sponge nickel was physically weak and that before the plaques could be impregnated with active materials for use as battery plates they had to be compressed and annealed, the latter operations being tantamount to the conventional sintering process. Carbon remained in the completed plaque, and this is considered to be an undesirable substance at the positive plate of a nickel-cadmium battery because of its tendency to oxidize to either carbon monoxide which would attack the plate, or to carbon dioxide which would contaminate the electrolyte and destroy the good low temperature characteristics of the nickel-cadmium system.

SUMMARY OF THE INVENTION

It has now been found that improved electrodeposited porous or sponge nickel plaques may be made by replacing the carbon additions with additions of finely divided nickel powder to conventional plating baths.

DESCRIPTION OF THE PREFERRED EMBODIMENT

Nickel powder may be obtained by the thermo-decomposition of nickel carbonyl, or the hydrogen reduction of ammoniacal solution of nickel (forward process). The type of nickel powder used may most readily be characterized in terms of its apparent density. Thus the best deposits have been obtained by the process of the invention using powder having an apparent density of one gram per cc. or less and this is therefore the preferred material. However, sponge deposits have been made using powder densities in excess of this up to about two grams per cc. The nickel powder must be kept in suspension in the plating bath, but the stirring rate must be slow enough to permit an adequate residence time at the cathode for the particels to adhere to the cathode surface. This residence time may be increased by the use of suitable magnetic fields. A concentration of about 10 to 60 grams per litre with moderate mechanical agitation is normally employed in the plating bath, but this concentration is not critical.

The source of nickel ion in conventional nickel-plating baths is generally one or more of the salts: nickel sulfate, nickel chloride, nickel fluoborate and nickel sulfamate. It has been found that the addition of nickel powder to plating baths containing one or more of these salts leads to cathodic deposition of nickel sponge, but only when the acidity is increased to values beyond those recommended for smooth nickel plating. The reason for this is not understood, but it may result from a necessity that the nickel powder particles be completely freed from a covering layer of oxide. The high acidity also diminishes the tendency for cathodic deposition of nickel hydroxide at high current densities. The deposits obtained from sulfamate, sulfate and chloride baths, for example, proceed through the sequence of roughened deposits to coarsely nodular to finely nodular to desirable sponge deposits as the acidity is increased. With fluoborate baths, the sequence is non-adherent sponge to adherent sponge as acidity is increased. The current density may be varied for most bath compositions from about 30 to about 700 milliamps per cm.$^2$ and may go as low as 10 milliamps per cm.$^2$ with plating baths having a high concentration of nickel chloride. The upper limit of the current density is determined either by the uniformity of the deposit or by the current carrying capacity of the cathode, particularly where the latter is a nickel foil. The acidity is normally and conveniently adjusted by the addition of the acid whose nickel salt is the source of nickel ion in the bath, so that the free acid concentration is in the range 0.1 to 2.0 equivalents per litre. For example, sulfuric acid is normally added to a nickel sulfate bath, fluoboric acid to a nickel fluoborate bath, etc. Either sulfuric acid or hydrochloric acid may be added to baths containing both nickel chloride and sulfate, and phosphoric acid may replace sulfuric acid or nickel phosphate replace part of nickel sulfate in baths containing the latter salt providing the total phosphate concentration is below that which precipitates nickel phosphate. Too high an acidity favors a rapid dissolution of the nickel powder. This in turn leads to a reduction of the hydrogen ion concentration, so the acidity of the bath is to some extent self-regulatory. The acidity may also be regulated by controlling anode area. The acidity of the bath may be measured using a glass electrode and a calibration curve showing free acid vs. "pH" as a meter reading, but more satisfactorily by direct titration.

Boric acid is normally added to nickel plating baths, and may be added to the baths according to the invention. It appears to serve more than a buffering action, in some baths increasing the uniformity of the deposit. However, sponge nickel may be deposited without addition of the boric acid.

The preferred cathodes are materials having a nickel surface and in fact it appears that the initial deposition of the nickel is in the form of a plate rather than a sponge. The anode is also preferably nickel in order to replenish the nickel ion in the bath, and should be arranged so that the undue contact with the nickel powder, and therefore dissolution of the latter, does not take place. An anode bag, for instance of microporous inert plastic material, may be used for this purpose.

Electrolytically deposited sponge nickel is useful as a support for active material for high-rate nickel-cadmium battery electrodes, especially where deposits within the range of thickness 0.003 inch to 0.013 inch and even up to 0.030 inch are desired. Such electrodes have a thickness of up to 0.060 inch plus the thickness of the support, and are particularly useful in the manufacture of nickel-cadmium batteries, wherein the negative plate is obtained by depositing sponge cadium within the pores of the sponge nickel deposit, and/or the positive plate is obtained by anodizing the nickel sponge deposit or otherwise impregnating it with electrochemically active positive material such as nickel oxides. Nickel plates bearing electrolytically deposited sponge nickel should be useful wherever sintered nickel plaques have been used as support for active material, particularly where thin deposits are desired, or as electrodes for other electrolytic cells. In particular, such nickel plates may be used for the electrolytic production of hydrogen at high currents where increasing the surface area is very beneficial.

The following examples illustrate some successful bath compositions and plating conditions in accordance with the invention. The abbreviations gm., l., ma. and cm. stand for grams, litres, milliamperes and centimetres respectively. For these examples there was used either a nickel powder having an apparent density of about 1 gm., per cubic cm. or about 2 gms., per cubic cm., some of the examples being repeated to obtain a direct comparison of the use of the lower density powder with the use of the higher density powder. No very great differences were noticed in the results obtained, although slightly better deposits were obtained with the lower density material.

EXAMPLE I $NiSO_4.6H_2O$—250–350 gm./l.
$H_3BO_3$—30 gm./l.
$H_2SO_4$—sufficient to maintain free acid content between 0.1 and 1.0 N.
Fine nickel powder—10–60 gm./l.
Current density—0–300 ma./cm.$^2$
Temperature—30 to 70° C.

In the acidity range specified, relatively infrequent Ni powder and $H_2SO_4$ additions are required.

EXAMPLE II $NiCl_2.6H_2O$—300 gm./l.
Boric acid—30 gm./l.
Fine nickel powder—10–60 gm./l.
Temperature—30 to 70° C.
Current density—10 to 300 ma./cm.$^2$
HCl—sufficient to maintain a free acid content greater than 0.1 N, and is very critical for operation of the plating bath.

It has been found that it is much more difficult to maintain the acidity at an acceptable level with the bath of Example II than with that of Example I.

EXAMPLE III $NiSO_4.6H_2O$—300–350 gm./l.
$NiCl_2.6H_2O$—25–60 gm./l.
$H_3BO_3$—30 gm./l.
Fine nickel powder—10–60 gm./l.
$H_2SO_4$—sufficient to maintain acidity value between 0.1 and 0.3 N.
Temperature—30 to 70° C.
Current density—100–300 ma./cm.$^2$ This bath leads to less uniform deposits than those of Examples I and II.

EXAMPLE IV $Ni(BF_4)_2$—250–450 gm./l.
$HBF_4$—sufficient to maintain free acid content greater than 0.2 N.
Fine nickel powder—30–60 gm./l.
Temperature—30–70° C.
Current density—70–700 ma./cm.$^2$

EXAMPLE V $Ni(SO_3NH_2)_2$—30 gm./l. to saturated solution at given operating temperatures of bath.
$HSO_3NH_2$—sufficient to maintain free acid content greater than 0.2 N.
Fine nickel powder—30–60 gm./l.
Boric acid—0–30 gm./l.
Temperature—30–70° C.
Current density—70–700 ma./cm.$^2$

What is claimed is:

1. A process for the direct electrodeposition of adherent and coherent highly porous nickel sponge on an electrically conductive substrate which comprises electrolyzing a plating bath containing said substrate as the cathode and a nickel anode at a temperature range of from 30 to 70° C. by passing a direct current between said cathode and said anode at a current density of between 10 and 700 milliamperes per square centimetre of cathode surface, said plating bath containing:
   (a) an aqueous solution of a nickel salt selected from nickel sulfate, nickel sulfamate, and nickel chloride;
   (b) free acid in a concentration between 0.1 and 2.0 normal, the anion of said acid being identical to the anion of the nickel salt selected; and
   (c) nickel powder having an apparent density of less than 2 grams per cubic centimetre present in said bath in a concentration of 10 to 60 grams per litre.

2. A process as claimed in claim 1 wherein the plating bath contains boric acid in a concentration of up to 30 grams per litre.

3. A process as claimed in claim 1 wherein the nickel powder has an apparent density of not greater than 1 gram per cubic centimetre.

4. A process as claimed in claim 3 wherein the nickel salt is nickel sulfate, the free acid is sulfuric acid and the current density is between 30 and 300 milliamperes per square centimetre.

5. A process as claimed in claim 4 wherein the concentration of nickel sulfate in the plating bath is between 250 and 350 grams per litre measured as nickel sulfate hexahydrate.

6. A process as claimed in claim 3 wherein the nickel salt is nickel sulfamate, the free acid is sulfamic acid and the current density is maintained between 70 and 700 milliamperes per square centimetre.

7. A process as claimed in claim 6 wherein the concentration of nickel sulfamate in the plating bath is between 30 grams per litre and the saturation concentration.

8. A process as claimed in claim 3 wherein the plating bath is subtsantially an aqueous solution of nickel chloride acidified with hydrochloric acid and the current density is in the range from 10–300 milliamperes per square centimetre.

References Cited

Peter F. Varadi et al.: Journal of the Electrochemical Society, vol. 109, No. 4, pp. 292–295 (1962).

Thomas M. Rodgers: "Handbook of Practical Electroplating," pp. 225–227 (1959).

GERALD L. KAPLAN, Primary Examiner

U.S. Cl. X.R.

136—24, 28, 75, 76; 204—16, 38 R